(12) United States Patent
Skiba et al.

(10) Patent No.: US 9,866,696 B2
(45) Date of Patent: Jan. 9, 2018

(54) SKILL CHANGE AND ROUTING CORRECTION

(71) Applicant: Avaya Inc., Santa Clara, CA (US)

(72) Inventors: David Skiba, Golden, CO (US); Valentine C. Matula, Granville, OH (US); George Erhart, Loveland, CO (US)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 14/573,898

(22) Filed: Dec. 17, 2014

(65) Prior Publication Data

US 2016/0182719 A1    Jun. 23, 2016

(51) Int. Cl.
*H04M 3/51* (2006.01)
*H04M 3/523* (2006.01)

(52) U.S. Cl.
CPC ................. *H04M 3/5233* (2013.01)

(58) Field of Classification Search
CPC ...... H04M 3/5175; H04M 3/523; H04M 3/51; H04M 3/5183; H04M 3/5233; H04M 3/5191; H04M 3/5232
USPC ............. 379/265.01–265.02, 265.05, 266.02
See application file for complete search history.

(56) References Cited

U.S. PATENT DOCUMENTS

| | | | |
|---|---|---|---|
| 8,634,543 B2 | 1/2014 | Flockhart et al. | |
| 8,964,958 B2 | 2/2015 | Steiner | |
| 9,225,833 B1* | 12/2015 | Koster | H04M 3/5175 |
| 2006/0146783 A1 | 7/2006 | Yurchenko | |
| 2007/0071224 A1* | 3/2007 | Shtivelman et al. | G06Q 10/107 379/265.02 |
| 2010/0128854 A1* | 5/2010 | LaCroix | H04M 3/42221 379/88.04 |
| 2010/0235218 A1 | 9/2010 | Erhart et al. | |
| 2011/0125793 A1 | 5/2011 | Erhart et al. | |
| 2011/0125826 A1 | 5/2011 | Erhart et al. | |

OTHER PUBLICATIONS

U.S. Appl. No. 14/481,684, filed Sep. 9, 2014, Michaelis.
"Call Steering," Nuance Communications, © 2014, 5 pages [retrieved from http://www.nuance.com/for-business/natural-language-understanding/call-steering/index.htm].

* cited by examiner

*Primary Examiner* — Rasha Al Aubaidi
(74) *Attorney, Agent, or Firm* — Sheridan Ross P.C.

(57) ABSTRACT

Customer of a contact center often provide information related to their call that is use to route the call to an appropriate agent. As a result, a work item is created and routed to an agent selected, at least in part, as having a skill associated with the information provided. However, the information is often missing or wrong. As an agent processes the work item, it may become apparent that the work item was misrouted and if the true nature of the work item was known earlier, the work item would have been routed to a different agent. Provided with respect to certain embodiments, misrouted work items are identified and, if appropriate, rerouted to an appropriate agent for processing.

20 Claims, 5 Drawing Sheets

| Reported routing attribute | Actual routing attribute | Correlation Value | |
|---|---|---|---|
| International | "Oxford" | .98 | ← 308A |
| International | "Frankfurt"/"Frankfort" | .68 | ← 308B |
| Domestic | "Rome" | .13 | ← 308C |
| French | (all English/no French) | .06 | ← 308D |
| German | "Flughafen" | .99 | ← 308E |

SKILL CHANGE AND ROUTING CORRECTION

FIELD OF THE DISCLOSURE

The present disclosure is generally directed toward data processing and analytics of a contact center.

BACKGROUND

Call monitoring in contact centers can provide information on problems, profitability, and performance. Call monitoring can include gathering data on what types of calls come into the contact center and how the calls have been routed and handled. This data can be very useful and allow administrators to determine whether or not calls are being routed correctly and efficiently. Appropriate call routing and reporting allows the administrators and/or workforce management applications to make staffing recommendations and predictions for future needs, which may be critical to keeping operations running at high productivity levels.

Historically, a certain number of calls into a contact center may not be marked with the skills used by resources to process those calls. Getting correct skills marked for either transfer (future route) and for reporting, agent evaluation, etc. can be highly valuable to the contact center management.

SUMMARY

It is with respect to the above issues and other problems that the embodiments presented herein were contemplated. With respect to certain embodiments disclosed herein, method and various apparatuses determine when a call has been misrouted. The determination is made during the call by using speech analytics. Once the determination is made that a call was misrouted, the call is marked with the corrected routing attribute, such as by using skill change/correction. Additionally, monitoring and alerting of supervisors and/or agents is provided, such as to give recommendations for the calls and/or the misrouting incident.

In one embodiment, an evaluation is made of the primary/non-primary skills of a routed call during the interaction between a caller and an agent. This is a reevaluation of the routed skills using speech analytics to detect language, topic, service vs. support, sales, etc. As a certain number of calls are not marked with the skills used during the call or are marked incorrectly, regardless of what was requested or to what skill the call was ultimately assigned, these mismarked or mark-omitted calls may be reassigned to an appropriate agent having the skills associated with actual need of the call.

Calls may be initially matched and routed to an appropriate agent with skills matching the customer's request. The customer request may come through a front end interactive voice response (IVR) system with speech, dual-tone multi-frequency (DTMF) menus, or through some other method of determining the customer's need.

During the call with the selected agent, the speech models detect various attributes of the spoken dialog related to the routed skills, including but not limited to:

Language spoken (English, German, Spanish, Mandarin, Portuguese, Hindi, Arabic, Japanese, etc.)

Topic of the conversation (international flight, domestic flight, lost bag, etc.)

Actions of the call (billing, service, support, sales, etc.)

Location/Region (USA, Germany, Brazil, Thailand, Japan, India, China, Bahrain, etc.)

Specific products

Any other language, dialect, or spoken attribute can be monitored based on the business routing plan.

During the call, warnings or route suggestions may be provided to the agent as an indicator that he or she is off-topic. Other agent activities may also be factored into the metrics (i.e., agent screens, agent transfers, etc.).

Supervisor notification may also be included for agents who have a determined pattern of allowing misrouted calls to continue. Post-call, the information from route avoidance calls can be provided for reporting and/or as warnings based on specific agent's performance. An additional analysis may be provided to provide summary and/or detailed data on how many agents are incorrectly tolerating misroutes and how many customers are deliberately practicing route avoidance.

In a non-limiting example, a call arrives and is accepted as a work item at an airline's international desk for French-speaking customers. The call turns out to actually contain a request for a US domestic booking and the conversation is conducted entirely in English. Based on the identification of English and English key words, the call can be marked during the interaction for the appropriate skills. This re-classification can also be used in case of transfer to another agent and/or for the next call to booking, such as to provide context of the call in advance or during the call with the next agent. In this example, international agents have higher value than English-speaking agents, so time and money are wasted when a call that can be handled by an agent handling work items in English is assigned to one that is a French specialist.

In another embodiment, speech analytics and time on call, including too much quiet time, may be used to identify a misroute of a current call. The misrouted call may then be handed by a different, more appropriate agent. A work assignment engine can be employed to re-assign/re-match the call during the interaction based on cost/benefit analysis, re-evaluation, and alerting to agents and supervisors.

As a benefit of the solution provided by the embodiments disclosed, a significant improvement may be made over the prior art in providing accurate end-to-end routing and information for work assignment, work force management, visual IVR, IVR options, route patterns, VDNs, and other benefits.

In another embodiment, statistics are provided on whether or not routing was cost effective, including success for calls that are routed away to a different agent when criteria not initially met. Supervisors may be provided reports and data to support coaching of agents on when to transfer (e.g., hold a "gold" customer, send a "silver," etc.). The speech analytics can be effectively tied to skills and provide data, reports, and/or alerts.

In other example, a "silver" customer says, "Don't transfer me again." The system may automatically alert the agent not to transfer based on the speech analysis. In another case, an agent in phone support gets a call where the caller is yammering on about issues with an iPad, so the system alerts the agent based on the keywords identified to transfer the call and marks the skill appropriately. Additionally, the agent performance monitoring systems and databases are updated so as to not penalize the initial or the receiving agent for the time on call and/or time to resolution. In another example, a caller chose Arabic on an IVR menu, but speaks to an agent in English. The system may prompt the agent to transfer the call to a lower value resource to preserve a scarce resource while setting a limit on the number of transfers.

In one embodiment, a server is disclosed, comprising: a memory operable to store accessible data and processor instructions; a network interface that interconnects the server to network components via a communication network; and a processor performing:

accessing a work item received by a contact center; determining at a first time, a reported routing attribute of the work item; routing the work item to a first agent of the contact center for processing the work item, the first agent being selected in accord with the reported routing attribute; receiving, at a second time, indicia of an actual routing attribute and the second time being after the first agent has initiated processing of the work item; and upon determining the reported routing attribute is different from the actual routing attribute, executing a misrouting action.

In another embodiment, a system is disclosed, comprising: means to store data and processor instructions; means to interconnect the server to network components via a communication network; and means to process data further comprising: accessing a work item received by a contact center; determining at a first time, a reported routing attribute of the work item; routing the work item to a first agent of the contact center for processing the work item, the first agent being selected in accord with the reported routing attribute; receiving, at a second time, indicia of an actual routing attribute and the second time being after the first agent has initiated processing of the work item; and upon determining the reported routing attribute is different from the actual routing attribute, executing a misrouting action.

In another embodiment, a processor is disclosed, configured to perform operations comprising: accessing a work item received by a contact center; determining at a first time, a reported routing attribute of the work item; routing the work item to a first agent of the contact center for processing the work item, the first agent being selected in accord with the reported routing attribute; receiving, at a second time, indicia of an actual routing attribute and the second time being after the first agent has initiated processing of the work item; and upon determining the reported routing attribute is different from the actual routing attribute, executing a misrouting action.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that other aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Any reference in the description comprising an element number, without a subelement identifier when a subelement identifiers exist in the figures, when used in the plural is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components and devices that may be shown in block diagram form, and are well known, or are otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
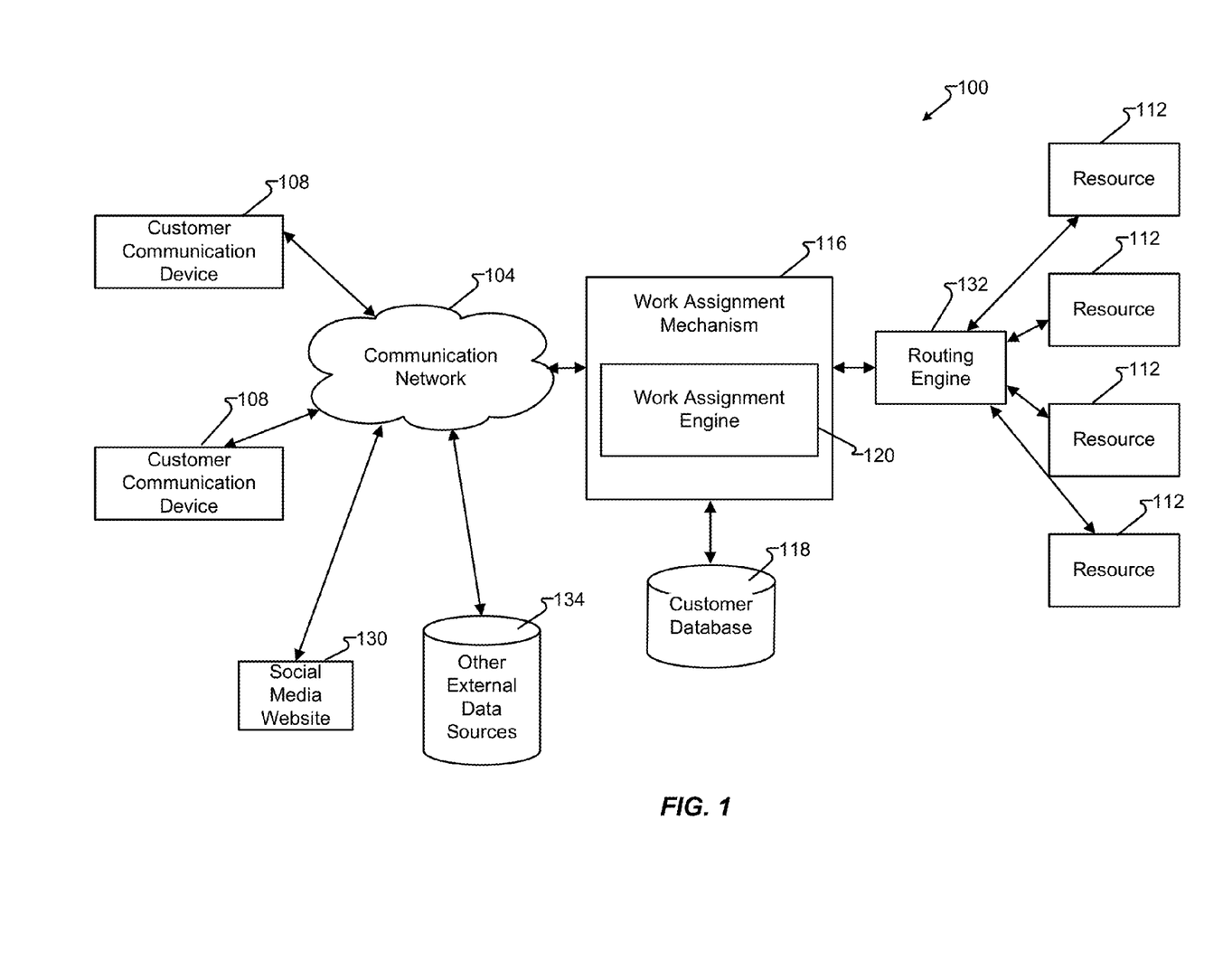
FIG. 1 illustrates a communication system in accordance with embodiments of the present disclosure.

With reference now to FIG. 1, communication system 100 is discussed in accordance with at least some embodiments of the present disclosure. The communication system 100 may be a distributed system and, in some embodiments, comprises a communication network 104 connecting one or more communication devices 108 to a work assignment mechanism 116, which may be owned and operated by an enterprise administering a contact center in which a plurality of resources 112 are distributed to handle incoming work items (in the form of contacts) from customer communication devices 108. Additionally, social media website 130 and/or other external data sources 134 may be utilized to provide one means for a resource 112 to receive and/or retrieve contacts and connect to a customer of a contact center. Other external data sources 134 may include data sources such as service bureaus, third-party data providers (e.g., credit agencies, public and/or private records, etc.). Customers may utilize their respective customer communication device 108 to send/receive communications utilizing social media website 130.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes and Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 104 need not be limited to any one network type, and instead may be comprised of a number of different networks and/or network types. As one example, embodiments of the present disclosure may be utilized to increase the efficiency of a grid-based contact center. Examples of a grid-based contact center are more fully described in U.S. patent application Ser. No. 12/469,523 to Steiner, the entire contents of which are hereby incorporated herein by reference. Moreover, the communication network 104 may comprise a number of different communication media such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item, which is generally a request for a processing resource 112. Illustrative work items include, but are not limited to, a contact directed toward and received at a contact center, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication, such as social media server 130. An example of such a harvested communication includes a social media communication that is harvested by the work assignment mechanism 116 from a social media network or server. Exemplary architectures for harvesting social media communications and generating work items based thereon are described in U.S. patent application Ser. Nos. 12/784, 369, 12/706,942, and 12/707,277, filed Mar. 20, 1010, Feb. 17, 2010, and Feb. 17, 2010, respectively, each of which are hereby incorporated herein by reference in their entirety.

The format of the work item may depend upon the capabilities of the communication device 108 and the format of the communication. In particular, work items are logical representations within a contact center of work to be performed in connection with servicing a communication received at the contact center (and more specifically the work assignment mechanism 116). The communication may be received and maintained at the work assignment mechanism 116, a switch or server connected to the work assignment mechanism 116, or the like until a resource 112 is assigned to the work item representing that communication at which point the work assignment mechanism 116 passes the work item to a routing engine 132 to connect the communication device 108 which initiated the communication with the assigned resource 112.

Although the routing engine 132 is depicted as being separate from the work assignment mechanism 116, the routing engine 132 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112 via the combined efforts of the work assignment mechanism 116 and routing engine 132. The resources 112 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact centers.

As discussed above, the work assignment mechanism 116 and resources 112 may be owned and operated by a common entity in a contact center format. In some embodiments, the work assignment mechanism 116 may be administered by multiple enterprises, each of which has their own dedicated resources 112 connected to the work assignment mechanism 116.

In some embodiments, the work assignment mechanism 116 comprises a work assignment engine 120 which enables the work assignment mechanism 116 to make intelligent routing decisions for work items. In some embodiments, the work assignment engine 120 is configured to administer and make work assignment decisions in a queueless contact center, as is described in U.S. patent application Ser. No. 12/882,950, the entire contents of which are hereby incorporated herein by reference. In other embodiments, the work assignment engine 120 may be configured to execute work assignment decisions in a traditional queue-based (or skill-based) contact center.

The work assignment engine 120 and its various components may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users. Work assignment mechanism 116 may access customer database 118, such as to retrieve records, profiles, purchase history, previous work items, and/or other aspects of a customer known to the contact center. Customer database 118 may be updated in response to a work item and/or input from resource 112 processing the work item.

In one embodiment, a message is generated by customer communication device 108 and received, via communication network 104, at work assignment mechanism 116. The message received by a contact center, such as at the work assignment mechanism 116, is generally, and herein, referred to as a "contact." Routing engine 132 routes the contact to at least one of resources 112 for processing.

Figure 2:
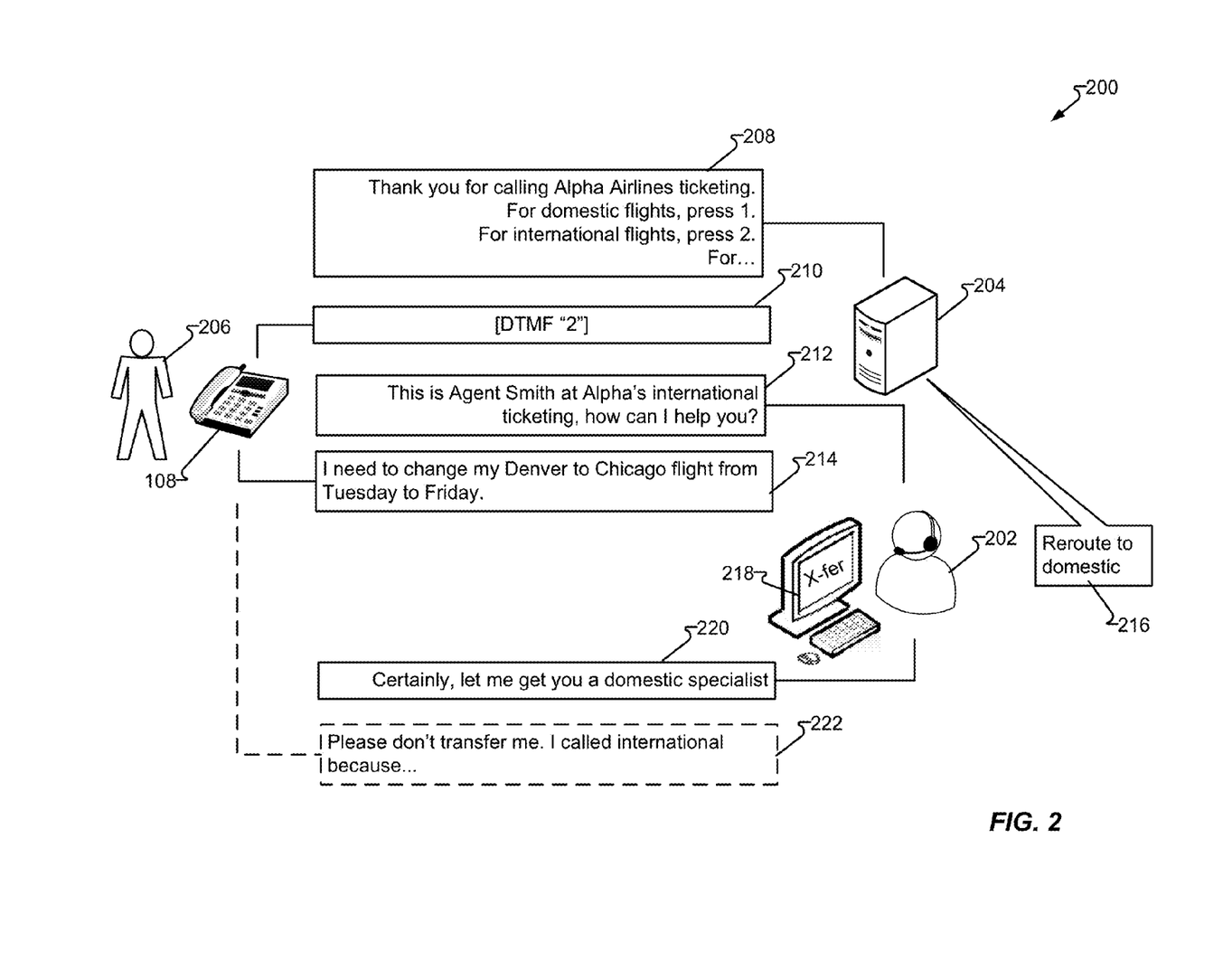
FIG. 2 illustrates an interaction between components of a contact center interaction and a caller in accordance with embodiments of the present disclosure.

FIG. 2 illustrates interaction 200 between components of a contact center and a caller, such as customer 206, in accordance with embodiments of the present disclosure. In one embodiment, interaction 200 comprises a dialogue between customer 206, utilizing customer communication device 108, and a portion of a contact center. The portion of the contact center illustrated in interaction 200 includes server 204 executing an IVR application and agent 202 utilizing agent endpoint 218 and omits portions that would unnecessarily complicate the figure and the description thereof, such as by omitting inclusion of components that are either well known or otherwise described with respect to FIG. 1. In one embodiment, agent 202 is one of resources 112 of the contact center, comprising a human agent performing real-time interactions with customer 206.

In one embodiment, customer 206, utilizing customer communication device 108, calls and a contact center initiating an initial response by server 204 running an IVR application and audibly presents dialogue portion 208 to customer 206. In response to dialogue portion 208, customer 206 presses the "two" on the keypad of customer communication device 108, thereby causing DTMF tone for "two" to be presented in dialogue portion 210 and the associated reported routing attribute (e.g., international flights) is thereby provided by customer 206 for routing by server 204. In response, server 204 routes the call to an agent selected in accord with a skill of the agent associated with reported routing attribute provided by the selection, such as an international agent 202 having skills, such as international flight booking, customs, visas, etc.

In response to receiving the call, agent 202 provides dialogue portion 212 greeting the customer 206 and initiating the processing of the work item. In response, customer 202 provides dialogue portion 214 which comprises an actual routing attribute (e.g. a domestic flight) that is different from the reported routing attribute.

In another embodiment, server 204 monitors the dialog between customer 206 and agent 204. In the process of monitoring, server 204 detects a misroute condition. The misroute condition exists as the reported routing attribute (e.g., international flights) receiving at a first time, such as prior to the selection of agent 202, does not agree with the actual routing attribute (e.g., domestic flights) received at a second time, namely while agent 202 was engaged in processing the call. In response, server 204 performs a misroute action. In one embodiment, the misroute action provides whisper notification 216 presented to agent 202, such as a computer generated voice instructing agent 202 to transfer the call. In another embodiment, the misroute action causes a text or graphical notification to be presented on endpoint 218 associated with agent 202. In response to the misroute action, agent 206 provides dialogue portion 220, such as to notify customer 206 that they will be transferred to a more appropriate agent. Server 204 and/or agent 202 selects an appropriate agent or performs other rerouting action, such as causing the call to be re-queued for an agent having the more appropriate skill (e.g., domestic flights).

In another embodiment customer 206 and/or an attribute associated with the call may indicate an override situation whereby the agent omits the transferring of the call to another agent and/or server 204 omits notifying agent 202 to transfer the call. For example, customer 206 may provide dialogue portion 222 indicating that they do not want to be transferred to another agent. Alternatively, server 204 may determine that customer 206 is ineligible for rerouting. For example, customer 206 is a "gold" level customer and such customers are not subject to rerouting. Additionally, agent 202 may him or herself determine that the call is ineligible for rerouting. For example, customer 206 spoke words determined by server 204 to indicate a misroute, such as a difference between the reported routing attribute (e.g., international) and an actual routing attribute (e.g., domestic) when customer 206 was determined to have said, "Frankfort." "Frankfort" was misinterpreted as a reference to Kentucky and a domestic issue. However, agent 202 understood the word to be, "Frankfurt" and an international issue. Therefore, when notified to transfer the call to, "domestic," agent 202 appropriately chose not to do so. However, having agents processing work items that are outside of their skills is generally undesirable to the contact center as performance and customer satisfaction typically suffer. Accordingly, agents 202 who ignores instructions to reroute one or more calls without having cause to hold the call, may have such actions held against them as a negative performance indicator.

Figure 3:
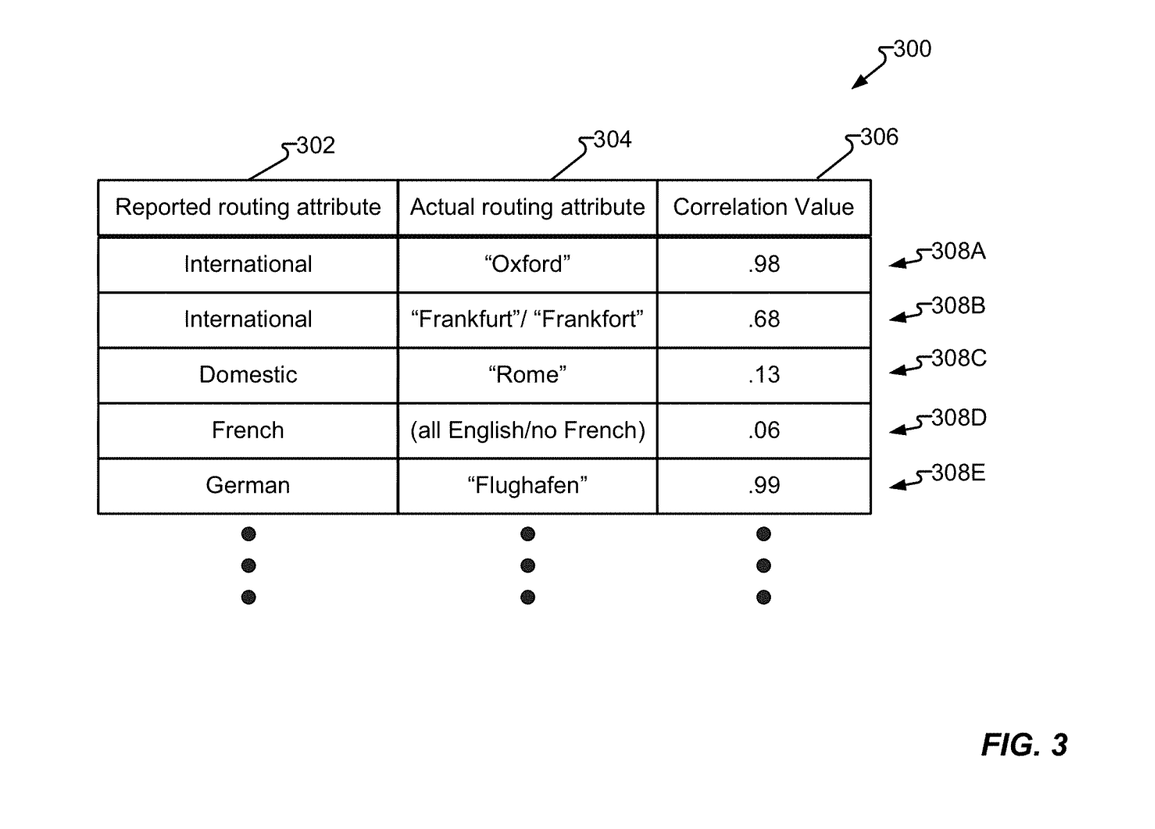
FIG. 3 illustrates a data table in accordance with embodiments of the present disclosure.

FIG. 3 illustrates data table 300 in accordance with embodiments of the present disclosure. In one embodiment, data table 300 illustrates a table of a database associating reported routing attributes and actual routing attributes with an associated correlation value. For example, data table 300 comprises column 302 having reported routing attributes, column 304 comprises actual routing attributes, and column 306 comprises correlation value associating column 302 with column 304 for each of a number of records 308.

As a benefit of accessing data table 300, server 204 may determine the likelihood of a misrouted condition based on the correlation value associated with the reported routing attribute and an actual routing attribute. For example, customer 206 who selects domestic flights and is therefore associated with record 308C and the corresponding entry in column 302 (e.g., "domestic"). Accordingly, customer 206 is routed to an agent having skills associated with processing work items associated with domestic flights. As the work item is being processed, customer 206 begins to discuss, "Rome," which is an entry of record 308C in column 304, indicating an actual routing attribute. Server 204 identifies record 308C in column 306 as indicating a low correlation value, which in the instant embodiment, indicates a low correlation and a misrouted work item, such as when the work item relates to Rome, N.Y. In another embodiment, server 204 may compare the correlation to a threshold and if one or a plurality of correlation values in column 306 is above the threshold, indicating a misrouted work item.

As can be appreciated by those of ordinary skill in the art, the specific configuration of the table 300 may be modified without departing from disclosure provided herein. For example correlation values in column 306 may indicate a match correlation, a mismatch correlation, or a combination of words and the resulting correlation which may be express as a decimal, percentage, positive/negative, or other format. For example the word "Rome," when said without any other geographic identifier may be assumed to be Rome Italy and have one correlation value, however when said with another geographic value, such as "Europe," "Italy," or New York has a different correlation value. In a further embodiment, the reported work attribute allows for the "benefit of the doubt" to have the reported routing attribute be correct. For example, if customer 206 selects international flights and says, "Rome" the correlation value may not indicate a disagreement with the actual routing attribute. Similarly, if customer 206 selects domestic flights and says Rome the correlation value may not indicate disagreement and assumes customer 206 intends to fly to Rome N.Y. In another embodiment, the average, median, mode or other statistical value may be derived to determine a correlation between a reported routing attribute and a number of actual routing attributes. Upon the said average, median, mode or other statistical value reaching a previously determined threshold, indicating a misrouted work item.

Figure 4:
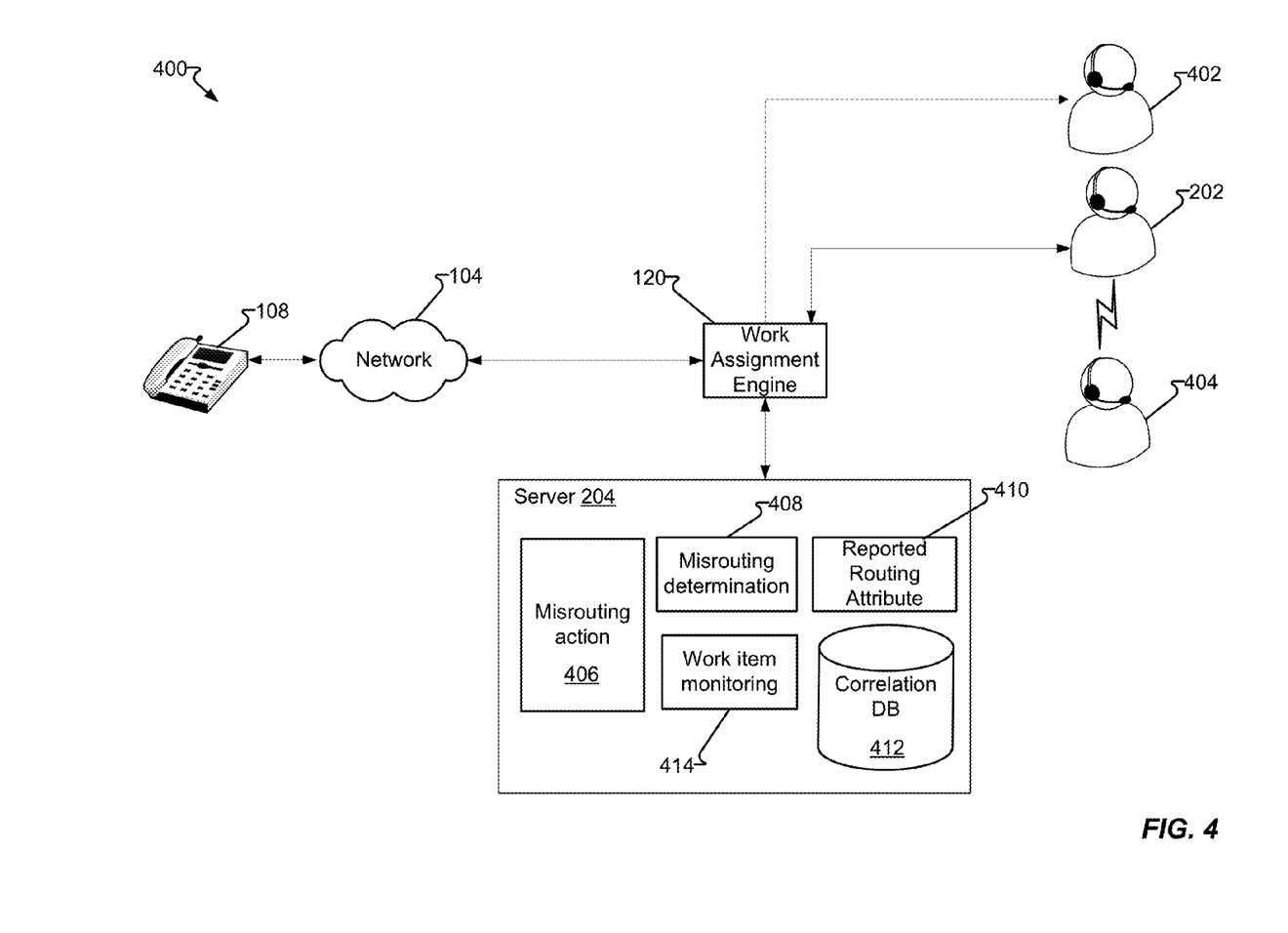
FIG. 4 illustrates a processing system in accordance with embodiments of the present disclosure.

FIG. 4 illustrates processing system 400 in accordance with embodiments of the present disclosure. In one embodiment, server 204 comprises processing components to perform misrouting detection and responses. For example, a call from customer 108 on customer communication device 106, via communications network 104, is routed by work assignment engine 120 to agent 202. The routing of the work item to agent 202 by server 204 is determined initially by an input upon customer communication device 108 (e.g. IVR, spoken command, etc.) and the resulting reported routing attribute. In monitoring the work item, server 202 may determine a misroute and cause the work item to be routed to other agent 402.

Server 204 may comprise a number of components. For example, reported routing attribute 410 is maintained in a memory of server 204 and received as a customer-determined input on customer communication device 108 (e.g., spoken selection, DTMF, etc.). Work item monitoring 414 monitors the call between customer communication device 108 and agent 202, such as by the utilization of speech analytics, and provides speech analytics to misrouting determination module 408. Correlation database 412 may comprise a repository of correlation values, such as data table 300, or other records whereby a reported routing attribute may be determined by misrouting determination module 408 to agree or disagree with actual routing attributes.

In another embodiment, misrouting action 406, upon being notified by misrouting determination module 408, of a misrouted work item selects an appropriate misrouting response. The misrouting response may be to wait, such as when a correlation value does not yet justify rerouting the work item or taking action to cause the rerouting of the work item. For example server 204 may cause notification to agent 202 to reroute the call. Agent 202, if holding on to calls for too long after being instructed to perform a reroute, may risk degrading the operational parameters of the contact center or themselves and server 204 may notify supervisor 404 of the non-compliance with the instruction. Supervisor 404 may provide whisper commentary, join the call, or other action to monitor, investigate, and/or instruct agent 202 to comply with the reroute instruction provided by server 204. Agent 202 may select a specific other agent 402 or work assignment engine 120 may perform the selection of other agent 402 directly or via assignment to a queue associated with a number of agents having the skill associated with the actual routing attribute.

Figure 5:
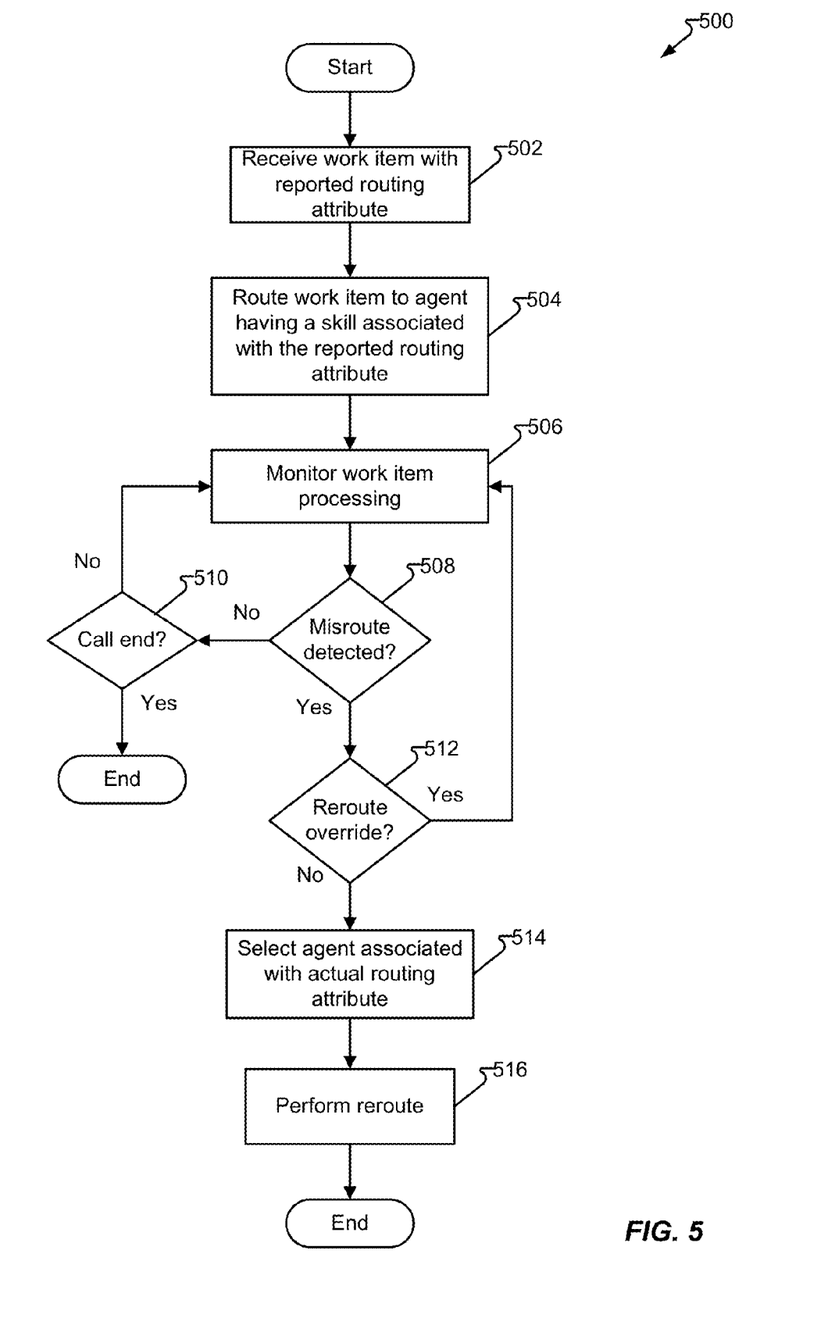
FIG. 5 illustrates a process in accordance with embodiments of the present disclosure.

FIG. 5 illustrates process 500 in accordance with embodiments of the present disclosure. In one embodiment step 502 receives the work item having the reported routing attribute. Step 504 routes the work item to an agent having a skill associated with the reported routing attribute. The reported routing attribute may be based on language preference, product or service, type of business inquiry (e.g. billing sales returns complaints etc.), or other attribute is determined by a matter of design choice by the contact center. After the work item has been routed to an agent, step 506 monitors the work item as it is being processed. If step 508 determines the work item is misrouted, processing continues to step 512. If step 508 determines there is not a misroute and step 510 determines the call has not ended, monitoring at step 506 continues, until such time as no misroute is determined by step 508 and call in 510 is determined affirmatively.

If step 508 determines there is a misroute, step 512 may optionally be executed to determine if there is an override condition. For example the customer misspoke, was incorrectly interpreted, or has a priority status or other attribute that prevents the call associated with that customer from being rerouted. If step 512 is answered affirmatively, processing continues back at step 506 or may simply terminate monitoring with respect to a particular work item which is now known not to be subject to rerouting. However, in another attribute the override condition may apply to one portion of the work item and not to another. For example, a high priority customer may not be subject to rerouting based on a particular product (e.g. international flights, domestic flights, etc.) but may be subject to rerouting based on type of business (e.g. billing inquiry, refunds, etc.) in which case step 512 may be evaluated a number of times.

Upon step 512 determining an override condition is not present, or if step 512 is not implemented, processing continues to step 514 whereby another agent is selected to receive the work item. Step 516 then performs the rerouting option which may be automatic, such as by execution of instructions of routing engine 132, work assignment mechanism 116, work assignment engine 120, and/or other components operable to perform the reroute. However, the reroute may be a prompt to the agent and thereby allow the agent to trigger the reroute, such as following the agent's notification to the customer of the transfer. Step 516 then performs the reroute and the call is provided to an agent in accord with the actual routing attribute.

While the embodiments described herein may be primarily directed towards work items comprising voice calls, other types of work items may also benefit from the disclosure provided herein. For example, video calls and other real-time or near real-time communications are more time sensitive due to the communication comprising a back-and-forth interactions being delivered incrementally as created. Therefore, detecting and rerouting misrouted video or other real-time communications is also provided by the embodiments herein. In another embodiment, the application of the forgoing embodiments to non-real time communications, such as email exchanges and text messages, is provided without departing from the disclosure provided herein.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A server, comprising:
   a memory operable to store accessible data and processor instructions;
   a network interface that interconnects the server to network components via a communication network; and
   a processor performing:
      accessing a work item received by a contact center;
      determining at a first time, a reported routing attribute of the work item;
      making a first routing decision whereby a first agent of the contact center is selected to receive the work item in accordance with the reported routing attribute being associated with a first skill of the first agent;
      routing the work item to the first agent for processing the work item;
      monitoring a dialog between the first agent and a customer associated with processing the work item;
      receiving, at a second time and from the monitored dialog, indicia of an actual routing attribute and the second time being after the first agent has initiated processing of the work item and wherein the first agent remains able to process the work item;
      accessing a database record comprising a correlation entry for the actual routing attribute and the reported routing attribute; and
      upon determining the correlation entry is above a previously determined threshold, executing a misrouting action.

2. The server of claim 1, wherein the misrouting action comprises a signal to the first agent to reroute the work item to a second agent selected in accord with the actual routing attribute.

3. The server of claim 2, wherein the processor monitors the work item for a rerouting action following the signal and, failing to detect the rerouting within a predetermined time, performing a supervisory action.

4. The server of claim 1, wherein the misrouting action comprises a signal to the first agent indicating an off-topic conversation.

5. The server of claim 1, wherein the work item is associated with an override attribute whereby the misrouting action is omitted until such time as the override attribute is removed.

6. The server of claim 5, wherein the override attribute is set upon the processor determining the customer associated with the work item has requested not to be subject to the misrouting action.

7. The server of claim 1, further comprising:
accessing a plurality of database records, each database record comprising the correlation entry for the actual routing attribute and the reported routing attribute; and
upon determining the correlation entry of at least one of the plurality of database records the correlation entry is above the previously determined threshold, executing the misrouting action.

8. The server of claim 7, wherein the processor further performs, upon determining the reported routing attribute is not above the previously determined threshold substantially the same as the actual routing attribute, modifying the correlation entry in accord with the determination of a substantial similarity between the reported routing attribute and the actual routing attribute.

9. The server of claim 1, wherein the processor further performs:
executing the misrouting action, upon determining the work item is being processed by the first agent in a manner that is (i) taking longer than a previously determined duration or (ii) includes quiet time beyond a previously determined amount.

10. A system, comprising:
means to store data and processor instructions;
means to interconnect a server to network components via a communication network; and
means to process data further comprising:
accessing a work item received by a contact center;
determining at a first time, a reported routing attribute of the work item;
making a first routing decision whereby a first agent of the contact center is selected to receive the work item in accordance with the reported routing attribute being associated with a first skill of the first agent;
routing the work item to the first agent for processing of the work item;
monitoring a dialog between the first agent and a customer associated with processing the work item;
receiving, at a second time and from the monitored dialog, indicia of an actual routing attribute and the second time being after the first agent has initiated processing of the work item and wherein the first agent remains able to process the work item;
accessing a database record comprising a correlation entry for the actual routing attribute and the reported routing attribute; and
upon determining the correlation entry is above a previously determined threshold, executing a misrouting action.

11. The system of claim 10, wherein the misrouting action comprises a signal to the first agent to reroute the work item to a second agent selected in accord with the actual routing attribute.

12. The system of claim 10, wherein the misrouting action comprises a signal to the first agent indicating an off-topic conversation.

13. The system of claim 10, wherein the work item is associated with an override attribute whereby the misrouting action is omitted until such time as the override attribute is removed.

14. The system of claim 13, further comprising means to set the override attribute upon determining the customer associated with the work item has requested not to be subject to the misrouting action.

15. The system of claim 13, wherein the override attribute is set upon the actual routing attribute being associated with a second agent having a greater resource cost than a resource cost associated with the first agent.

16. The system of claim 10, further comprising:
accessing a plurality of database records, each database record comprising the correlation entry for the actual routing attribute and the reported routing attribute; and
upon determining the correlation entry of at least one of the plurality of database records the correlation entry is above the previously determined threshold, executing the misrouting action.

17. The system of claim 10, wherein the misrouting action comprises a resubmission of the work item to a routing engine for routing of the work item to a second agent associated with the actual routing attribute.

18. A processor, configured to perform operations comprising:
accessing a work item received by a contact center;
determining at a first time, a reported routing attribute of the work item;
making a first routing decision whereby a first agent of the contact center is selected to receive the work item in accordance with the reported routing attribute being associated with a first skill of the first agent;
routing the work item to the first agent for processing the work item;
monitoring a dialog between the first agent and a customer associated with processing the work item;
receiving, at a second time and from the monitored dialog, indicia of an actual routing attribute and the second time being after the first agent has initiated processing of the work item and wherein the first agent remains able to process the work item;
accessing a database record comprising a correlation entry for the actual routing attribute and the reported routing attribute; and
upon determining the correlation entry is above a previously determined threshold, executing a misrouting action.

19. The processor of claim 18, wherein the misrouting action comprises a signal to the first agent to reroute the work item to a second agent selected in accord with the actual routing attribute.

20. The processor of claim 18, wherein the misrouting action comprises a resubmission of the work item to a routing engine for routing of the work item to a second agent associated the actual routing attribute.

* * * * *